United States Patent
Tsirkin et al.

(10) Patent No.: US 11,449,339 B2
(45) Date of Patent: Sep. 20, 2022

(54) MEMORY BARRIER ELISION FOR MULTI-THREADED WORKLOADS

(71) Applicant: Red Hat, Inc., Raleigh, NC (US)

(72) Inventors: Michael Tsirkin, Westford, MA (US); Andrea Arcangeli, New York, NY (US)

(73) Assignee: Red Hat, Inc., Raleigh, NC (US)

(*) Notice: Subject to any disclaimer, the term of this patent is extended or adjusted under 35 U.S.C. 154(b) by 266 days.

(21) Appl. No.: 16/586,099

(22) Filed: Sep. 27, 2019

(65) Prior Publication Data

US 2021/0096856 A1  Apr. 1, 2021

(51) Int. Cl.
| | |
|---|---|
| *G06F 9/46* | (2006.01) |
| *G06F 9/30* | (2018.01) |
| *G06F 9/50* | (2006.01) |
| *G06F 9/48* | (2006.01) |
| *G06F 9/52* | (2006.01) |

(52) U.S. Cl.
CPC ............ *G06F 9/3009* (2013.01); *G06F 9/485* (2013.01); *G06F 9/5027* (2013.01); *G06F 9/522* (2013.01)

(58) Field of Classification Search
CPC ...... G06F 9/3009; G06F 9/5027; G06F 9/485; G06F 9/522
See application file for complete search history.

(56) References Cited

U.S. PATENT DOCUMENTS

| | | | |
|---|---|---|---|
| 6,117,181 A * | 9/2000 | Dearth | G06F 30/33 703/22 |
| 6,691,220 B1 * | 2/2004 | Guthrie | G06F 9/3838 712/30 |
| 6,697,834 B1 | 2/2004 | Dice | |
| 6,735,760 B1 * | 5/2004 | Dice | G06F 9/52 717/151 |
| 7,512,950 B1 * | 3/2009 | Marejka | G06F 9/52 718/102 |
| 9,385,976 B1 * | 7/2016 | Hath | H04L 47/826 |
| 9,507,637 B1 * | 11/2016 | Saville, III | G06F 9/5016 |
| 10,528,401 B1 * | 1/2020 | Ogata | G06F 8/458 |
| 2002/0087849 A1 * | 7/2002 | Arimilli | G06F 9/3834 712/E9.05 |
| 2002/0112122 A1 * | 8/2002 | Brown | G06F 12/0815 711/119 |
| 2004/0260726 A1 * | 12/2004 | Hrle | G06F 11/1466 |
| 2004/0267758 A1 * | 12/2004 | Katsurashima | G06F 16/184 |

(Continued)

OTHER PUBLICATIONS

Zeno et al. "GPUpIO: The Case for I/O-Driven Preemption on GPUs". GPGPU-9, ACM, Barcelona, Spain. (Year: 2016).*

(Continued)

*Primary Examiner* — Adam Lee
(74) *Attorney, Agent, or Firm* — K&L Gates LLP (57) ABSTRACT

A system includes a memory, at least one physical processor in communication with the memory, and a plurality of hardware threads executing on the at least one physical processor. A first thread of the plurality of hardware threads is configured to execute a plurality of instructions that includes a restartable sequence. Responsive to a different second thread in communication with the first thread being pre-empted while the first thread is executing the restartable sequence, the first thread is configured to restart the restartable sequence prior to reaching a memory barrier.

12 Claims, 6 Drawing Sheets

(56) References Cited

U.S. PATENT DOCUMENTS

| | | | |
|---|---|---|---|
| 2006/0048147 A1* | 3/2006 | Silvera | G06F 9/52 718/100 |
| 2007/0016905 A1* | 1/2007 | Rector | G06F 9/52 718/100 |
| 2007/0094669 A1* | 4/2007 | Rector | G06F 9/526 718/104 |
| 2007/0113233 A1* | 5/2007 | Collard | G06F 9/52 718/101 |
| 2007/0169126 A1* | 7/2007 | Todoroki | G06F 9/4881 718/103 |
| 2008/0104595 A1* | 5/2008 | Kawachiya | G06F 9/522 718/100 |
| 2008/0189501 A1* | 8/2008 | Irish | G06F 13/1631 711/E12.001 |
| 2008/0288750 A1* | 11/2008 | Clift | G06F 9/522 712/202 |
| 2009/0007070 A1* | 1/2009 | Magruder | G06F 9/526 717/120 |
| 2009/0193228 A1* | 7/2009 | Kasahara | G06F 15/16 712/E9.003 |
| 2009/0216958 A1* | 8/2009 | Biles | G06F 13/1668 711/E12.066 |
| 2009/0300621 A1* | 12/2009 | Mantor | G06T 1/20 718/100 |
| 2009/0322769 A1* | 12/2009 | Zhou | G06F 8/447 345/522 |
| 2010/0017655 A1* | 1/2010 | Gooding | G06F 11/1482 714/E11.03 |
| 2010/0083269 A1* | 4/2010 | Moody | G06F 9/526 718/104 |
| 2010/0287553 A1* | 11/2010 | Schmidt | G06F 9/485 718/101 |
| 2010/0333102 A1* | 12/2010 | Balasubramanian | G05B 19/0421 718/103 |
| 2011/0088037 A1* | 4/2011 | Glistvain | G06F 9/4843 718/103 |
| 2011/0093865 A1* | 4/2011 | Dawson | G06F 9/54 719/313 |
| 2011/0102441 A1* | 5/2011 | Rapp | G06F 8/433 345/440 |
| 2011/0209153 A1* | 8/2011 | Suzuki | G06F 9/5038 718/102 |
| 2012/0297394 A1* | 11/2012 | Allen | G06F 9/4881 718/103 |
| 2013/0117750 A1* | 5/2013 | Howes | G06F 9/524 718/102 |
| 2013/0173740 A1* | 7/2013 | Jea | G06F 15/17331 709/216 |
| 2013/0205121 A1* | 8/2013 | Guthrie | G06F 9/30145 712/220 |
| 2013/0212573 A1* | 8/2013 | Archer | G06F 9/522 717/171 |
| 2014/0007111 A1* | 1/2014 | Targowski | G06F 9/522 718/102 |
| 2014/0025892 A1* | 1/2014 | Williams, III | G06F 12/0862 711/E12.024 |
| 2014/0089589 A1* | 3/2014 | Meier | G06F 9/3838 712/214 |
| 2014/0149994 A1* | 5/2014 | Ihara | G06F 9/522 718/108 |
| 2014/0282564 A1* | 9/2014 | Almog | G06F 9/522 718/102 |
| 2014/0365734 A1* | 12/2014 | Bridge, Jr | G06F 12/084 711/144 |
| 2015/0032694 A1* | 1/2015 | Rajamani | G06F 16/2358 707/625 |
| 2015/0052537 A1* | 2/2015 | Gaster | G06F 9/3887 718/106 |
| 2015/0095600 A1* | 4/2015 | Bahnsen | G06F 9/466 711/163 |
| 2015/0160967 A1* | 6/2015 | Mason | G06F 9/528 710/267 |
| 2015/0205586 A1* | 7/2015 | Diamos | G06F 9/30087 717/158 |
| 2016/0139966 A1* | 5/2016 | Greco | G06F 9/48 718/106 |
| 2016/0154677 A1* | 6/2016 | Barik | G06F 9/5083 718/105 |
| 2016/0381050 A1* | 12/2016 | Shanbhogue | G06F 12/1036 726/23 |
| 2018/0174032 A1* | 6/2018 | Davies | G06N 3/08 |
| 2018/0239604 A1* | 8/2018 | Cain, III | G06F 9/384 |
| 2018/0239626 A1* | 8/2018 | Tsirkin | G06F 11/3072 |
| 2018/0293102 A1* | 10/2018 | Ray | G06F 9/4881 |
| 2019/0073243 A1* | 3/2019 | Jiang | G06F 9/526 |
| 2020/0004587 A1* | 1/2020 | Griffin | G06F 9/4856 |
| 2020/0104397 A1* | 4/2020 | Fan | G06F 9/52 |
| 2020/0192720 A1* | 6/2020 | Liu | G06F 12/0842 |
| 2020/0192742 A1* | 6/2020 | Boettcher | G06F 11/165 |

OTHER PUBLICATIONS

Regehr, John. "Scheduling Tasks with Mixed Preemption Relations for Robustness to Timing Faults". IEEE. (Year: 2002).*

Dice et al. "Mostly Lock-Free Malloc". Sun Microsystems, Inc. ISMM'02, Berlin, Germany. (Year: 2002).*

Dave Dice, Maurice Herlihy, Alex Kohan; "Fast Non-intrusive Memory Reclamation for Highly-Concurrent Data Structures"; Brown University and Oracle Labs, USA; Accessed on or before Jun. 24, 2019; (10 Pages).

* cited by examiner

MEMORY BARRIER ELISION FOR MULTI-THREADED WORKLOADS

BACKGROUND

Computer systems may run applications and processes that execute various instructions on a processor. Processors may execute instructions to perform tasks and complete work orders that may include instructions to read, write, and copy memory entries. The processors may use threads to complete tasks or work orders. Physical resources, such as a hardware thread (e.g., hyper-thread), may be associated with a processing core. Additionally, an operating system may schedule software threads. A software thread, which may be referred to as a thread of execution (or simply a thread) is a software unit. In a multi-processor/multi-core system, multiple threads can be executed in parallel. That is, each of the processors or cores may execute a thread simultaneously. One thread can pass a request to another thread to cause the request to be executed.

The various instructions may modify resources on the computer system, which may affect instructions from other processors or threads. For example, memory ordering may require memory barriers such as a read after a write memory barrier.

SUMMARY

The present disclosure provides new and innovative systems and methods for memory barrier elision for multi-threaded workloads. In an example, system includes a memory, at least one physical processor in communication with the memory, and a plurality of hardware threads executing on the at least one physical processor. A first thread of the plurality of hardware threads is configured to execute a plurality of instructions that includes a restartable sequence. Responsive to a different second thread in communication with the first thread being pre-empted while the first thread is executing the restartable sequence, the first thread is configured to restart the restartable sequence prior to reaching a memory barrier.

In an example, a method includes executing, by a first thread, a plurality of instructions that includes a restartable sequence. The method also includes receiving, by one of the first thread and a different second thread, an interrupt and pausing execution of the plurality of instructions due to the first thread being preempted. Responsive to the different second thread, in communication with the first thread, being preempted while the first thread is executing the restartable sequence, the method includes restarting the restartable sequence and continue executing the plurality of instructions prior to reaching a memory barrier.

In an example, a method includes executing, by a thread, a restartable portion of instructions to update a data structure. While executing the restartable portion, the method includes determining, by the thread, a status of the thread as one of (i) running on the same physical processor as a different thread and (ii) running on a different physical processor than the different thread. Responsive to determining the status as running on the same physical processor as the different thread, the method includes executing, by the thread, a read instruction within the restartable portion. Responsive to determining the status as running on a different physical processor, the method includes executing, by the thread, a read instruction after a write memory barrier by restarting the restartable portion of instructions.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for memory barrier elision for multi-threaded workloads. Memory ordering overhead is often a major source of overhead in multi-threaded workloads. In particular, in modern processor architectures, communication strategies between threads running on different processors (e.g., CPUs) typically requires a computationally expensive read after write memory barrier (e.g., mfence) or an atomic operation. For example, on an x86 processor, the read after write memory barrier instruction may take hundreds of CPU cycles to operate. The memory ordering overhead affects multi-threaded programs on a supervisor as well as communications between a thread executing on VCPUs that run on different host CPUs. Additionally, the memory ordering overhead may affect communications between a VCPU and a hypervisor thread.

Memory ordering overhead also applies to lock-less instructions. For example, lock-less instructions, such as restartable sequences, may require a barrier. If an instruction sequence checks a value in memory to determine whether an interrupt is needed to notify another thread about more data, the instruction sequence (e.g., thread executing the instruction sequence) must execute a barrier before checking, and avoiding such a barrier is often impossible for many instruction sequences. Specifically, without executing the barrier, the read could occur speculatively. For example, a thread may access a memory value speculatively while the value is being modified or before the value is updated, thereby resulting in a dirty read.

To address the problems discussed above, an operating system or a supervisor may be extended to support a reverse restartable sequence of code, which may be a region of code that is tagged as atomic. The restartable sequence may be restarted when a thread has been preempted. Additionally, the restartable sequence may be restarted when another thread in communication with the thread executing the restartable sequence is preempted. If a thread is preempted, the operating system is extended to export information about which thread runs on which processor or CPU. For example, the operating system may export information that a thread is in a read-only section such as a virtual dynamic shared object ("VDSO"). If the preempted thread is a kernel thread, then the above information may be readily available.

However, the information regarding which thread runs on which processor or CPU may change immediately after it is read. To eliminate race conditions, a communication thread may check whether other communicating threads run on the same physical CPU, but as another hyper-thread (e.g., running on another logic CPU in a hyper-threaded configuration). If the two hyper-threads run on the same CPU, then the read may be executed without a memory barrier because the physical CPU may not reorder reads, so a barrier is unnecessary in this case. Checking whether the threads run on the same CPU may be computationally inexpensive (e.g., a single CPU cycle), which is significantly less than the hundreds of CPU cycles that may be wasted executing a read after write memory barrier.

Conversely, if the communicating threads run on different physical CPUs, the thread executes a read after write memory barrier followed by a read to ensure that the read is not a speculative read or that the memory operations have not been reordered (e.g., resulting in a dirty read). In the scenario where the communicating threads run on different physical CPUs, the read instruction may have bypassed the write instruction if the sequence is restarted (e.g., possibly reading out of order or speculatively reading). However, since the read is safe to restart, the thread re-executes the restartable sequence. By performing the above check (e.g., whether the communicating threads execute on the same or different physical CPUs), the barrier is advantageously avoided in scenarios where the communicating threads execute on a single physical CPU, which advantageously prevents wasting CPU cycles on an unnecessary barrier. Specifically, hyper-threads (e.g., logical CPUs) that are part of the same physical CPU typically share cache and write buffers. As mentioned above, reads may not be reordered for threads running on the same physical CPU, but for threads running on different physical CPUs, reads may be reordered.

Vendors using a hypervisor (e.g., Kernel-based Virtual Machine ("KVM")) on an operating system, such as Red Hat® Enterprise Linux® ("RHEL") may utilize the systems and methods disclosed herein for communication between VCPUs and the hypervisor as this type of communication is often asynchronous. When handling network traffic (e.g., network traffic from a cloud computing platform such as the Red Hat® OpenStack® Platform), hypervisor vendors and operating system ("OS") vendors often attempt to improve networking speed for hypervisors for use in networking stacks. An example vendor is Red Hat®, which offers RHEL. By eliminating the computational cost of wasted CPU cycles for certain communication, performance may be improved. For example, hundreds of CPU cycles may be wasted performing an unnecessary read after write memory barrier compared to a single CPU cycle that may be used performing a check to avoid executing the read after write memory barrier.

Figure 1:
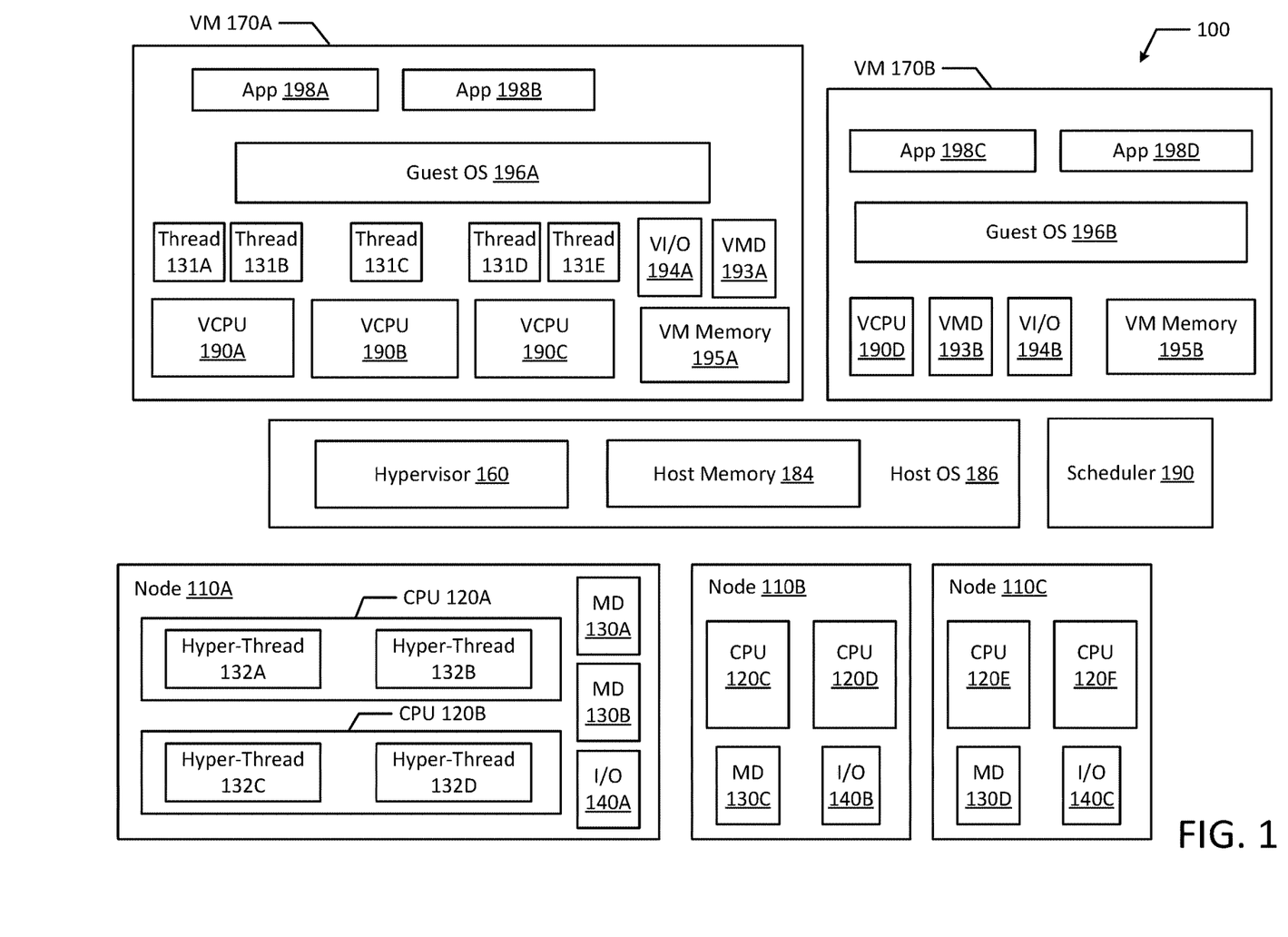
FIG. 1 illustrates a block diagram of an example computing system according to an example embodiment of the present disclosure.

FIG. 1 depicts a high-level component diagram of an example computing system 100 in accordance with one or more aspects of the present disclosure. The computing system 100 may include an operating system (e.g., host OS 186), one or more virtual machines (VM 170A-B), and nodes (e.g., nodes 110A-C).

The host operating system ("OS") 186 may also be referred to herein as supervisor 186. In an example, the supervisor may be a hypervisor or the host OS 186. Additionally, the host OS 186 may include the supervisor or a hypervisor 160. The supervisor 186 may be a program. For example, the supervisor 186 may be a program that constitutes the core of the host OS. As used herein, the supervisor 186 may refer to a privileged software component of the host OS. For example, the supervisor may have the ability to change memory mappings for an application (e.g., Application 198A-D). Additionally, the supervisor 186 may act as a controller of multiple processes including individual user processes within an application memory space. For example, the supervisor 186 may perform several tasks such as executing processes and handling interrupts. The supervisor 186 may also provide basic services such as memory management, process management, file management, and I/O management. In an example, the supervisor 186 may be a kernel or may be part of a kernel. Similarly, the system 100 may include a scheduler 190, which may have similar functions and features as supervisor 186. For example, the scheduler 190 may schedule task or threads (e.g., threads 131A-C or hyper-threads 132A-D), may execute processes and may handle interrupts.

The host OS or supervisor 186 may export information about which threads run on which processors (e.g., VCPU 190A-C and CPU 120A-F). The host OS or supervisor 186 may also notify threads (e.g., hyper-threads or software threads) of the CPU information (e.g., which threads are running on which CPUs). Information about which threads run on certain processors (e.g., the same processor as another thread or a different processor than another thread) advantageously allows a thread to execute a read without executing a read after write memory barrier in scenarios where the threads run on the same physical CPU, which prevents wasting CPU cycles on the computationally expensive read after write memory barrier operation.

Virtual machines 170A-B may include a guest OS, guest memory, a virtual CPU (VCPU), virtual memory devices (VMD), and virtual input/output devices (VI/O). For example, virtual machine 170A may include guest OS 196A, guest memory or virtual machine memory 195A, a virtual CPUs 190A-C, a virtual memory devices 193A, and virtual input/output device 194A. Virtual machine memory 195A may include one or more memory pages. Similarly, virtual machine 170B may include guest OS 196B, virtual machine memory 195B, a virtual CPU 190D, a virtual memory devices 193B, and virtual input/output device 194B. Virtual machine memory 195B may include one or more memory pages.

The computing system 100 may also include a hypervisor 160 and host memory 184. Hypervisor 160 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

Software threads (e.g., threads 131A-E) may be created by an application or a program (e.g., App 198A-B) and may be scheduled by a guest OS (e.g., guest OS 196A). A software thread, which may be referred to as a thread of execution (or simply a thread 131) is a software unit. As illustrated in FIG. 1, each virtual processor 190A-C may run one or more threads 131A-E. For example, VCPU 190A may run threads 131A-B, VCPU 190B may run thread 131C, and VCPU 190C may run threads 131D-E. A thread or ordered sequence of instructions may allow the virtual processors to execute multiple instruction streams simultaneously. For example, VCPU 190A may simultaneously run two instruction streams on threads 131A-B. Threads 131 are shown for illustrative purposes, it should be understood that each VCPU 190A-D may execute more than two threads 131.

In an example, a virtual machine 170A may execute a guest operating system 196A and run applications 198A-B which may utilize the underlying VCPU 190A, VIVID 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-F) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

The processors (e.g., CPU 120A-F) may use threads to complete tasks or work orders. Physical resources, such as a hardware thread or hyper-thread 132A-D, may be associated with a processing core. For example, there may be a single hardware thread or hyper-thread 132A-D per core on a processor. In a multi-processor/multi-core system, multiple threads can be executed in parallel. That is, each of the processors or cores may execute a thread simultaneously. One thread can pass a request to another thread to cause the request to be executed. As illustrated in FIG. 1, the hypervisor 160 executing on a plurality of physical processors may execute a VCPU of a virtual machine which is executing on a first hyper-thread (e.g., hyper-thread 132A) of the physical processor or CPU 120A. The physical processor 120A may include hyper-threads 132A-B and physical processor 120B may include hyper-threads 132C-D. Virtual machines may execute in different hyper-threads of the same processor. For example, the virtual machine 170A may execute in hyper-thread 132A while virtual machine 170B executes in hyper-thread 132B of CPU 120A. Conversely, virtual machines may execute in hyper-threads of different processors. For example, the virtual machine 170A may execute in hyper-thread 132A of CPU 120A while virtual machine 170B executes in hyper-thread 132D of CPU 120B.

As used herein, physical processor or processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). In a further aspect, a processor may provide a hyper-threading technology where a single physical processor may appear as two logical processors (e.g., hyper-threads 132A-B and hyper-threads 132C-D). In a processor (e.g., CPU 120A) using the hyper-threading technology, the physical processor resources are shared between the two logical processors and the architectural state is duplicated for the two logical processors (e.g., 132A and 132B). In an example, each processor may include more than two logical processors (e.g., three or four hyper-threads).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node, including the connections between a processor 120A-F and a memory device 130A-D may be provided by one or more local buses of suitable architecture, for example, peripheral component interconnect (PCI).

Figure 2:
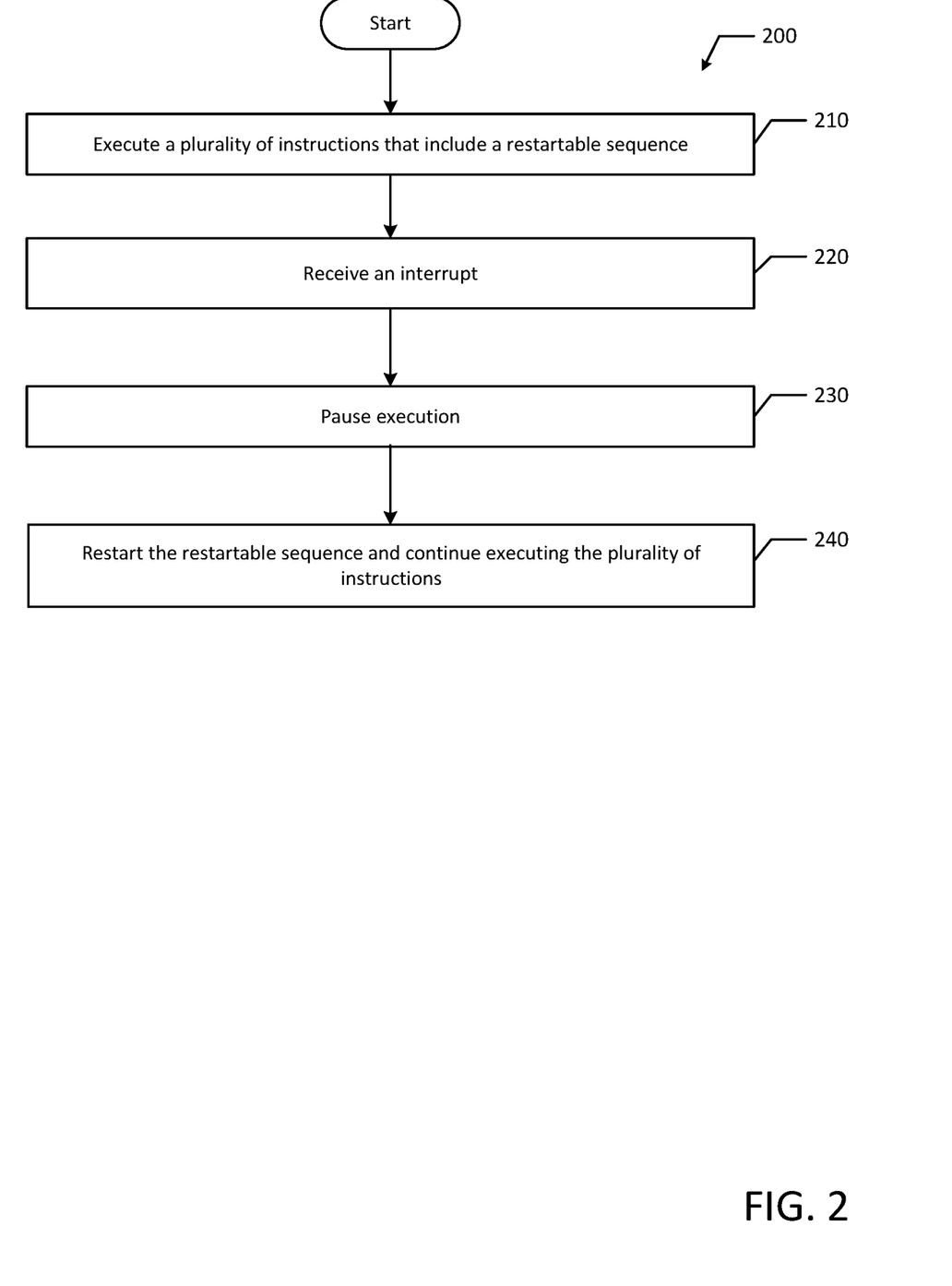
FIG. 2 illustrates a flowchart of an example process for memory barrier elision for multi-threaded workloads according to an example embodiment of the present disclosure.

FIG. 2 illustrates a flowchart of an example method 200 for memory barrier elision for multi-threaded workloads according to an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes executing a plurality of instructions that include a restartable sequence (block 210). In an example, the restartable sequence may be a portion or region of code that is tagged as atomic (e.g., an atomic range of instructions). For example, a first thread (e.g., a software thread 131A or a hyper-thread 132A) may execute a plurality of instructions. Additionally, the plurality of instructions may include a restartable sequence. In one example, the software thread 131A may execute a plurality of instructions. In another example, the hyper-thread 132A may execute the plurality of instructions. The method also includes receiving an interrupt (block 220). For example, the first thread (e.g., a software thread 131A or a hyper-thread 132A) or a different thread (e.g., a software thread 131B or a hyper-thread 132B) may receive an interrupt. Specifically, the software thread 131A may receive the interrupt. In another example, the hyper-thread 132A may receive the interrupt. Additionally, a different thread (e.g., a software thread 131B or a hyper-thread 132B) may receive the interrupt. The interrupt may preempt the thread that receives the interrupt.

Additionally, the method includes pausing execution (block 230). For example, the first thread (e.g., a software thread 131A or a hyper-thread 132A) or the different second thread (e.g., a software thread 131B or a hyper-thread 132B) may pause execution of the plurality of instructions due to the first thread being preempted. In an example, the software thread 131A may pause execution after being pre-empted. In another example, the software thread 131B may pause execution due to the software thread 131A being preempted. Additionally, hyper-thread 132A may pause execution after being preempted. A different hyper-thread, such as hyper-thread 132B may pause execution after hyper-thread 132A is preempted.

Then, method 200 includes restarting the restartable sequence and continuing execution of the plurality of instructions (block 240). For example, the different second thread (e.g., a software thread 131B or a hyper-thread 132B) may be in communication with the first thread (e.g., a software thread 131A or a hyper-thread 132A) and the different second thread may be preempted while the first thread is executing the restartable sequence. Responsive to the different second thread being preempted while the first thread is executing the restartable sequence, the first thread (e.g., a software thread 131A or a hyper-thread 132A) may restart the restartable sequence and continue executing the plurality of instructions prior to reaching a memory barrier. In an example, the first thread and the second thread may be software threads 131A and 131B respectively. In another example, the first thread and the second thread may be hyper-threads 132A and 132B respectively.

In an example, the restartable sequence may include a read instruction or a write instruction. The value of a data structure associated with the read instruction or the write instruction may depend on whether the different second thread (e.g., a software thread 131B or a hyper-thread 132B) in communication with the first thread (e.g., a software thread 131A or a hyper-thread 132A) is preempted before or after modifying the data structure. By restarting the restartable sequence if the second different thread is preempted, the system and methods disclosed here advantageously ensure that the most recent value of the data structure is used for the restartable portion of the instructions, which may advantageously eliminate race conditions since data may change immediately after it is read.

Figure 3:
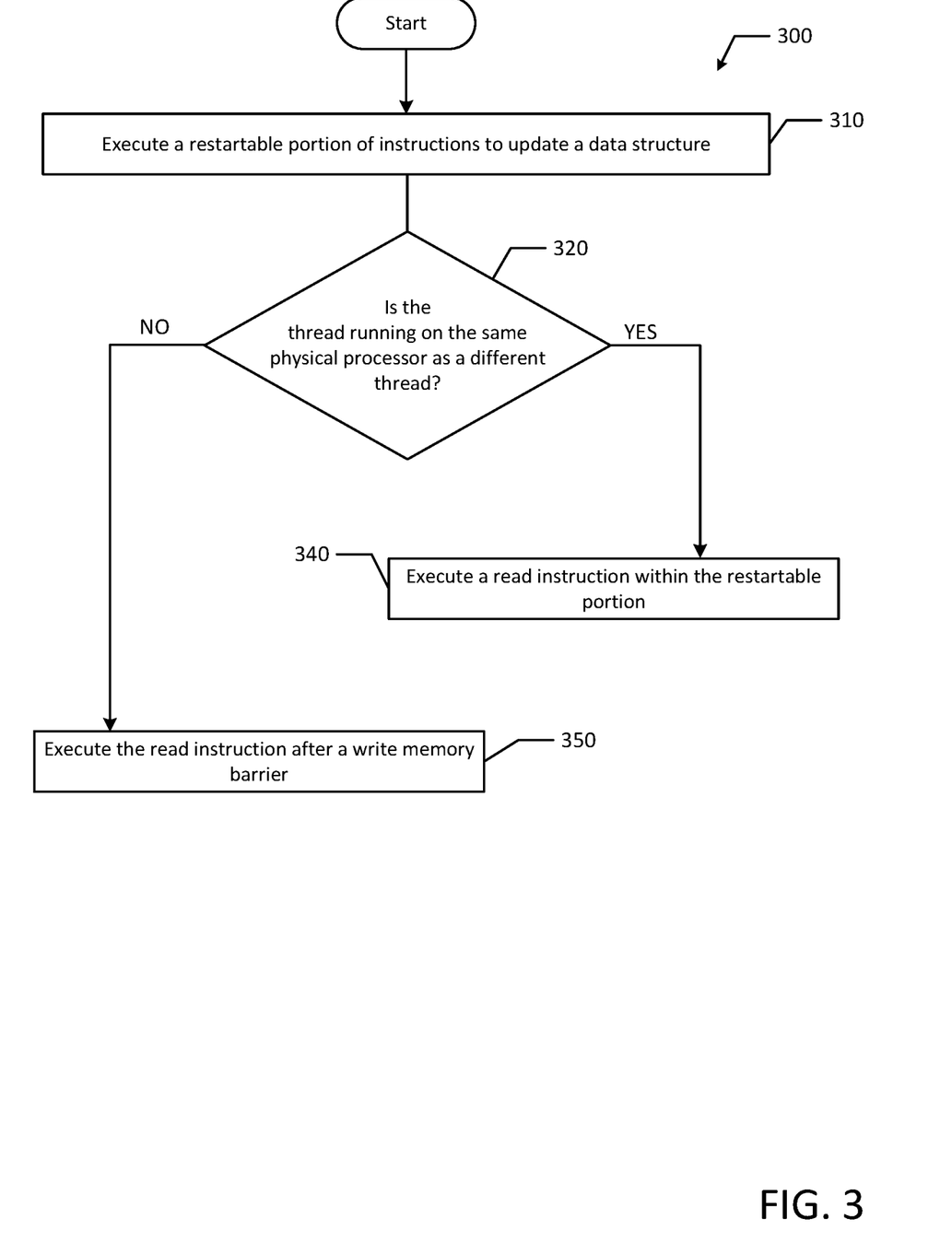
FIG. 3 illustrates a flowchart of an example process for memory barrier elision for multi-threaded workloads according to an example embodiment of the present disclosure.

FIG. 3 illustrates a flowchart of an example method 300 for memory barrier elision for multi-threaded workloads according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes executing a restartable portion of instructions to update a data structure (block 310). Similar to block 210 of method 200, a thread (e.g., a software thread 131A or a hyper-thread 132A) may execute a plurality of instructions that include a restartable portion. The restartable portion of the instructions may be to update a data structure. In an example, the thread may be a software thread 131A. In another example, the thread may be a hyper-thread 132A. The method also includes determining if the thread is running on the same physical processor as a different thread (block 320). Specifically, while executing the restartable portion, the thread (e.g., a software thread 131A or a hyper-thread 132A) may determine a status of the thread as either (i) running on the same physical processor (e.g., CPU 120A) as a different thread or (ii) running on a different physical processor (e.g., CPU 120B) than the different thread.

For example, the hyper-thread 132A may run on the same physical processor as the different hyper-thread 132B, such that both run on CPU 120. In another example, the hyper-thread 132A may run on a different physical processor as the different hyper-thread 132C, such that hyper-thread runs on CPU 120A and hyper-thread 132C runs on CPU 120B. Additionally, the threads may run on processors on different nodes (e.g., node 110A and node 110B). As discussed above, an operating system may export information about which threads run on certain processors (e.g., the same processor as another thread or a different processor than another thread).

If the thread is running on the same physical processor as the different thread, method 300 includes executing a read instruction within the restartable sequence (block 340). For example, responsive to determining the status as running on the same physical processor (e.g., CPU 120A) as the different thread (e.g., hyper-thread 132B), the thread (e.g., hyper-thread 132A) may execute a read instruction within the restartable portion. For example, by determining that both threads run on the same physical processor (e.g., CPU 120A), then the read instruction may be executed without a memory barrier because a physical CPU does not reorder reads and a barrier is unnecessary. Checking whether the threads run on the same CPU may be computationally inexpensive (e.g., a single CPU cycle), which is significantly less than the hundreds of CPU cycles that may be wasted executing an unnecessary read after write memory barrier.

If the thread is running on a different physical processor as the different thread, method 300 includes executing the read instruction after a write memory barrier (block 350). For example, responsive to determining the status as running on a different physical processor (e.g., CPU 120A) than the different thread (e.g., hyper-thread 132C running on CPU 120B), the thread (e.g., hyper-thread 132A) may execute a read instruction after a write memory barrier by restarting the restartable portion of instructions. For example, since different CPUs may re-order reads, the thread (e.g., hyper-thread 132A) executes a read after write memory barrier followed by a read to ensure that the read is not a speculative read or that the memory operations have not been reordered (e.g., resulting in a dirty read), which advantageously prevents a dirty read.

Figure 4A:
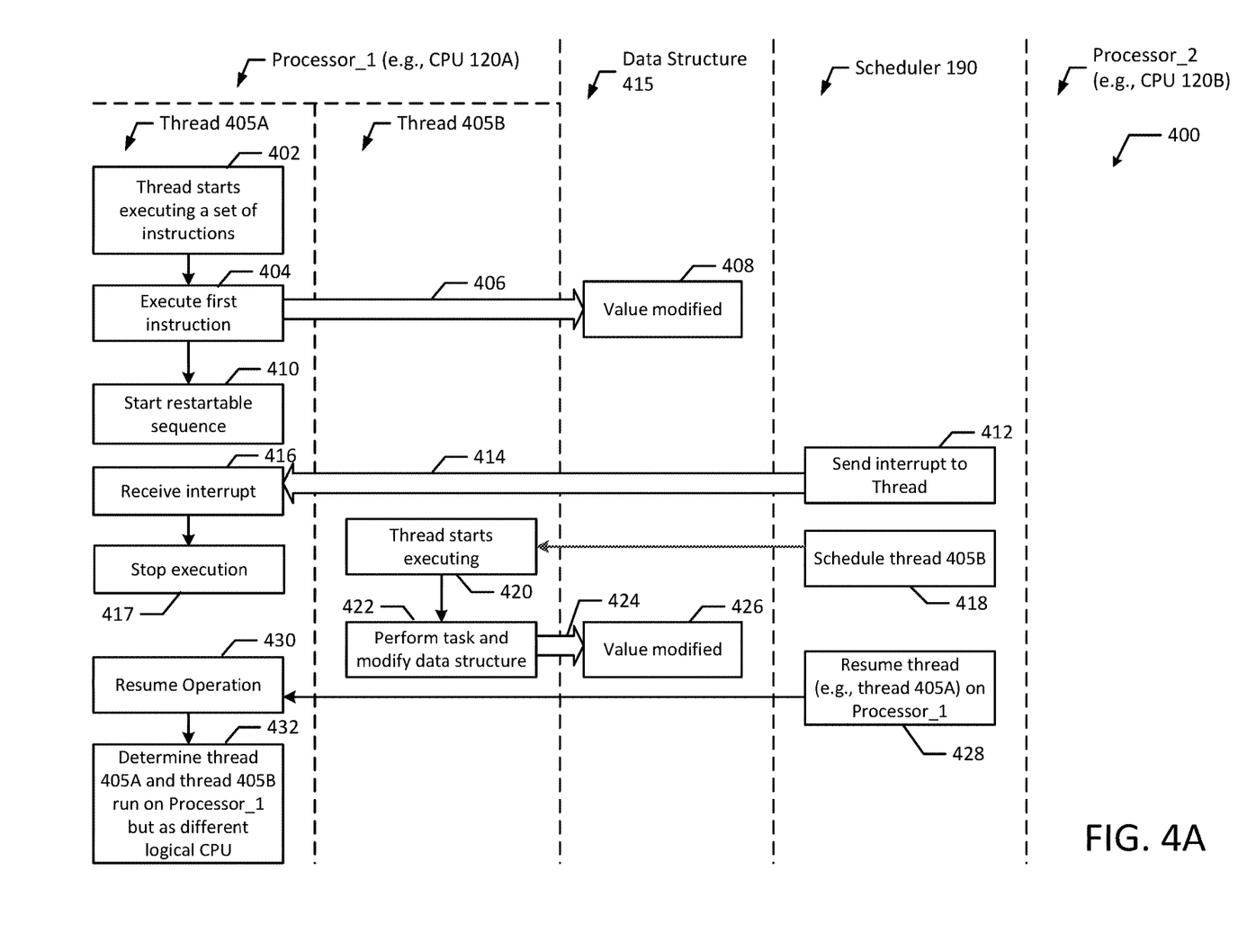
FIGS. 4A and 4B illustrate a flow diagram of an example process for memory barrier elision according to an example embodiment of the present disclosure.
Figure 4B:
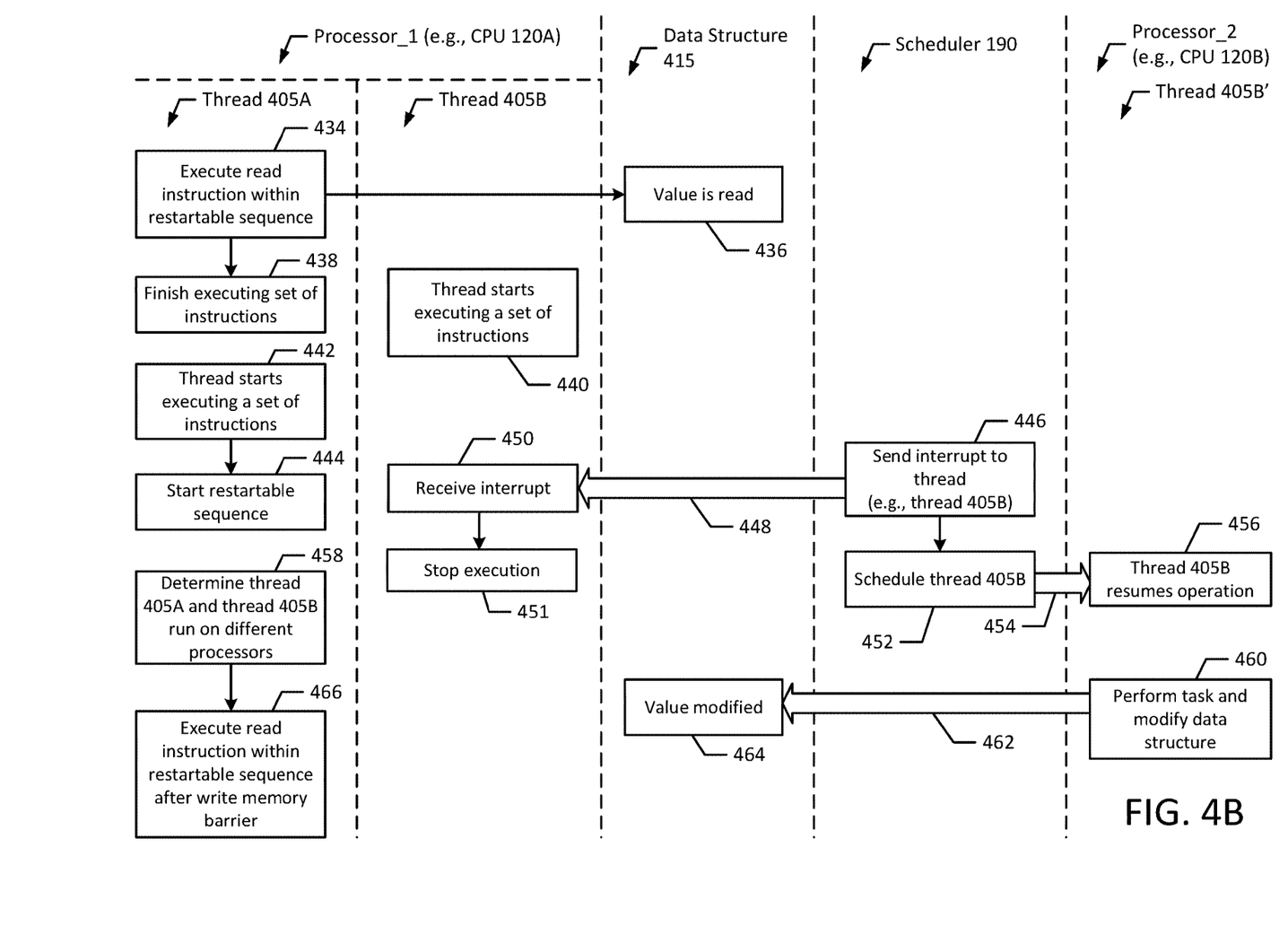

FIGS. 4A and 4B illustrate a flowchart of an example method 400 for reverse restartable sequences for memory barrier elision in accordance with an example embodiment of the present disclosure. Although the example method 400 is described with reference to the flowchart illustrated in FIGS. 4A and 4B, it will be appreciated that many other methods of performing the acts associated with the method 400 may be used. For example, the order of some of the blocks may be changed, certain blocks may be combined with other blocks, blocks may be repeated, and some of the blocks described are optional. For example, a scheduler 190 may communicate with threads 405A and 405B, which may correspond to hyper-threads 132A, 132B and/or 132C. The threads 405A and 405B may communicate with a data structure 415 and the supervisor 186 to perform example method 400. The threads 405A-B in FIGS. 4A and 4B may be hyper-threads on the same CPU (e.g., CPU 120A) or different CPUs (e.g., CPU 120A and CPU 120B). Additionally, the threads 405A-B may be software threads on the same vCPU or different vCPUs.

In the illustrated example, thread 405A may start executing a set of instructions (block 402). Thread 405A may refer to a hardware thread or hyper-thread (e.g., hyper-thread 132A) or a software thread (e.g., thread 131A). At some point in the set of instructions, thread 405A may execute a first instruction to modify a data structure 415 (blocks 404 and 406). For example, the thread may modify a value in a database table. After executing the instruction, the data structure is modified (e.g., value is modified) (block 408). For example, an entry in the database table may be modified. Then, the thread 405A may start a restartable sequence (block 410). In an example, the restartable sequence may be an atomic section of the set of instructions.

Then, the scheduler 190 may send an interrupt to thread 405A (blocks 412 and 414) and thread 405A may receive the interrupt (block 416). After receiving the interrupt, thread 405A may pause or stop execution (block 417). For example, the interrupt may preempt the thread 405A. The scheduler 190 may schedule thread 405B (block 418). For example, thread 405A may be preempted so the scheduler 190 can schedule higher priority tasks or perform other work (e.g., via thread 405B). In an example, the thread 405B may start executing after thread 405A receives the interrupt. After being scheduled, thread 405B starts executing (block 420) and performs a task by modifying the data structure 415 (blocks 422 and 424). For example, thread 405B may modify an entry in the database table. Then, the value of the data structure 415 is modified (block 426).

The scheduler 190 may resume thread 405A on "processor_1" (e.g., CPU 120A). The scheduler 190 may reschedule the thread on the same CPU or a different CPU. After resuming operation (block 430), the thread 405A may determine that it runs on the same processor (e.g., CPU 120A) as thread 405B, but on different logical CPUs (e.g., as different hyper-threads on CPU 120A). Information regarding which processors run on which threads may be provided by the scheduler 190. In another example, the information may be provided by an operating system, such as the host OS 186.

Continuing on FIG. 4B, thread 405A may execute a read instruction within the restartable sequence (block 434). In the illustrated example, thread 405A may execute the read instruction without a read after write memory barrier (e.g., mfence) because both thread 405A and thread 405B run on the same physical CPU 120. Typically, a physical CPU does not reorder reads and a barrier is unnecessary. Determining whether the threads run on the same CPU may be computationally inexpensive (e.g., a single CPU cycle), which is significantly less than the hundreds of CPU cycles that may be wasted executing an unnecessary read after write memory barrier Then, the value of the data structure 415 is read (block 436). For example, the entry of the database table may be read without any type of memory barrier, which advantageously reduces memory management and ordering overhead associated with performing a read after write memory barrier. After reading the value, the thread 405A may finish executing the set of instructions (block 438).

Thread 405B may start executing a set of instructions (block 440). Thread 405A may also start executing a set of instructions (block 442) and may start executing a restartable sequence or restartable portion of the instructions (block 444). As discussed above, the restartable portion may be a portion of the instructions that are tagged as atomic. While the thread 405A is executing the restartable portion, scheduler 190 sends an interrupt to thread 405B (blocks 446 and 448). For example, the scheduler 190 may interrupt thread 405B to perform other work or to interrupt the thread so the thread can be rescheduled elsewhere (e.g., to evenly distribute threads across system resources). Then, thread 405B receives the interrupt (block 450) and stops execution (block 451) After the scheduler 190 interrupts thread 405B, the scheduler 190 schedules thread 405B on a different processor (e.g., CPU 120B) (blocks 452 and 454). For example, thread 405B may be rescheduled to a different processor (e.g., CPU 120A) to improve system efficiency. Then, thread 405B (illustrated as 405B' for running on CPU 120B instead of CPU 120A) resumes operation (block 456).

After thread 405B is rescheduled on CPU 120B, thread 405A may determine that thread 405A and thread 405B run on different processors (block 458). Information regarding which processors runs on which threads may be provided by the scheduler 190. In another example, the information may be provided by an operating system, such as the host OS 186. For example, in the illustrated example, thread 405A runs on CPU 120 and thread 405B' now runs on CPU 120B. The different processors may be different processors on the same node (e.g., node 110A). In another example, the different processors may be processors on different nodes (e.g., node 110A and node 110B). Because thread 405A and thread 405B run on different processors, thread 405A may have to wait to execute a read until a write memory barrier is completed. Thread 405B' may perform a task and modify the data structure 415 (blocks 460 and 462). For example, thread 405B may modify an entry in the database table. Then, the value of the data structure 415 is modified (block 464). After the data structure is written to, the thread 405A may then execute the read instruction within the restartable sequence according the write memory barrier (block 466).

Since the communicating threads 405A and 405B run on different physical CPUs, thread 405A executes a read after write memory barrier followed by a read to ensure that the read is not a speculative read or that the memory operations have not been reordered (e.g., resulting in a dirty read). Performing the check of whether the threads (e.g., thread 405A and thread 405B) run on the same processor is computationally inexpensive (e.g., a single CPU cycle) compared to the computational expense of executing a barrier in each scenario. However, as illustrated at block 434, in some cases, performing the check advantageously saves significant resources and improves performance by avoiding unnecessary barriers.

Typically, restartable sequences were applied in narrow scenarios. The systems and methods disclosed herein apply restartable sequences to read after write barriers such that the restartable sequences are more widely applicable to other use cases. Even though applying the restartable sequences to read after write barriers may cost an extra interrupt to another thread, preemption is typically rare enough that the additional computational cost is generally inconsequential.

Figure 5:
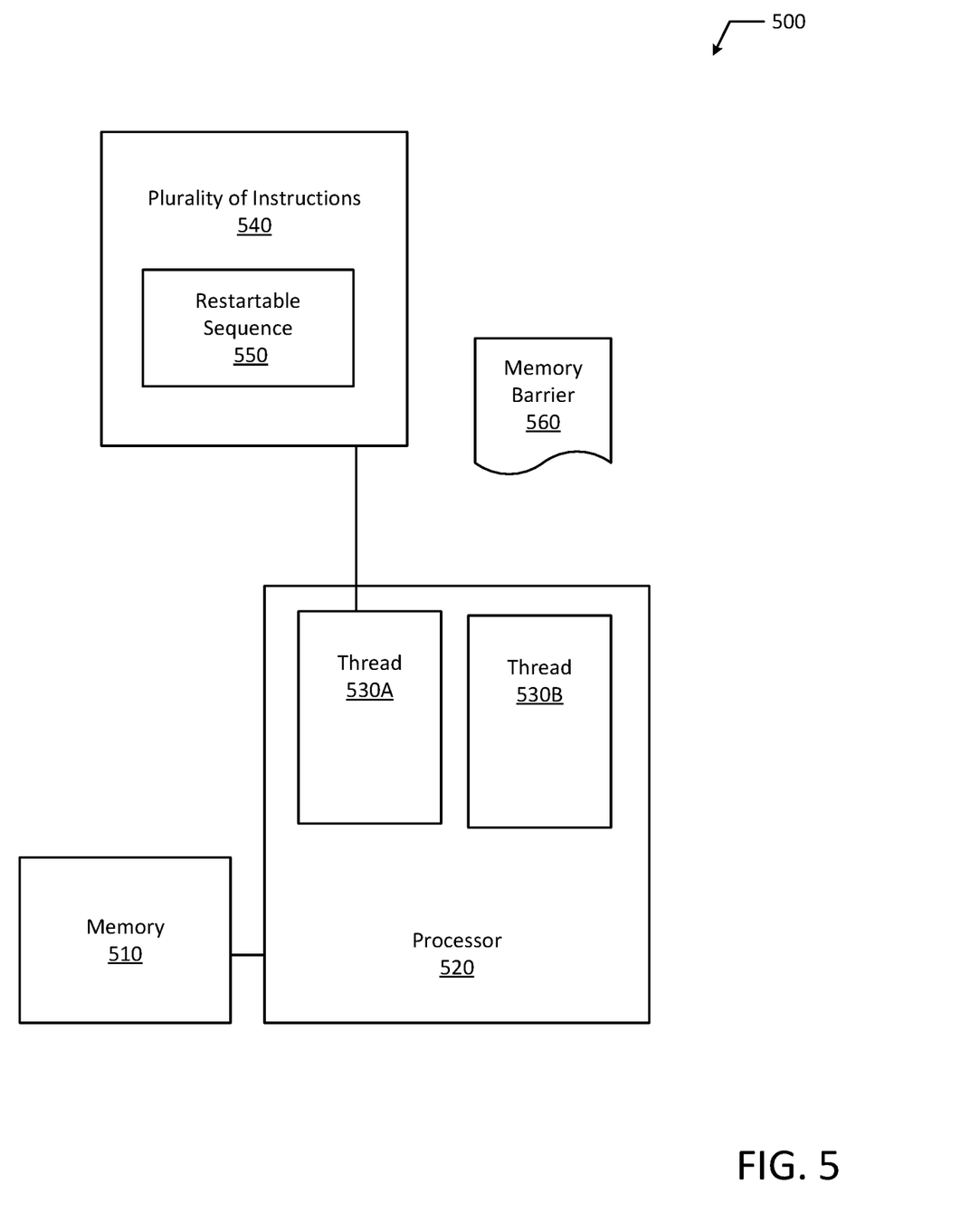
FIG. 5 illustrates a block diagram of an example memory barrier elision system according to an example embodiment of the present disclosure.

FIG. 5 is a block diagram of an example reverse restartable sequence system 500 according to an example embodiment of the present disclosure. System 500 includes a memory 510, at least one physical processor 520 in communication with the memory 510 and a plurality of hardware threads 530A-B executing on the at least one physical processor 520. A first thread 530A of the plurality of hardware threads 530A-B is configured to execute a plurality of instructions 540 that includes a restartable sequence 550. Responsive to a different second thread 530B in communication with the first thread 530A being pre-empted while the first thread 530A is executing the restartable sequence 550, the first thread 530A is configured to restart the restartable sequence 550 prior to reaching a memory barrier 560.

By restarting the restartable sequence 550 if the second different thread 530B is preempted, the system 500 advantageously ensures that dirty reads are avoided. For example, the restartable sequence 550 may be restarted if either thread 530A or thread 530B are preempted because both threads may be communicating with each other and may be accessing the same data.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a memory, at least one physical processor in communication with the memory, and a plurality of hardware threads executing on the at least one physical processor. A first thread of the plurality of hardware threads is configured to execute a plurality of instructions that includes a restartable sequence. Responsive to a different second thread in communication with the first thread being pre-empted while the first thread is executing the restartable sequence, the first thread is configured to restart the restartable sequence prior to reaching a memory barrier.

In accordance with a 2nd exemplary aspect of the present disclosure, which may be used in combination with any one or more of the preceding aspects (e.g., the 1st aspect), the restartable sequence includes a region of code that is tagged as atomic.

In accordance with a 3rd exemplary aspect of the present disclosure, which may be used in combination with any one or more of the preceding aspects (e.g., the 1st aspect), the restartable sequence is an atomic range of instructions.

In accordance with a 4th exemplary aspect of the present disclosure, which may be used in combination with any one or more of the preceding aspects (e.g., the 1st aspect), the plurality of instructions includes a read instruction to read a value after the restartable sequence.

In accordance with a 5th exemplary aspect of the present disclosure, which may be used in combination with any one or more of the preceding aspects (e.g., the 4th aspect), the restartable sequence includes a write instruction to modify the value.

In accordance with a 6th exemplary aspect of the present disclosure, which may be used in combination with any one or more of the preceding aspects (e.g., the 5th aspect), the first thread is configured to execute the read instruction without executing the memory barrier.

In accordance with a 7th exemplary aspect of the present disclosure, which may be used in combination with any one or more of the preceding aspects (e.g., the 1st aspect), the first thread and the different second thread execute on the same physical processor.

In accordance with an 8th exemplary aspect of the present disclosure, which may be used in combination with any one or more of the preceding aspects (e.g., the 1st aspect), the first thread and the different second thread execute on different physical processors of the at least one processor.

In accordance with a 9th exemplary aspect of the present disclosure, which may be used in combination with any one or more of the preceding aspects (e.g., the 1st aspect), the first thread is configured to resume operation on a different processor of the at least one processor.

In accordance with a 10th exemplary aspect of the present disclosure, which may be used in combination with any one or more of the preceding aspects (e.g., the 1st aspect), the first thread is configured to, responsive to the first thread being preempted while executing the restartable sequence, restart the restartable sequence upon resuming operation of the first thread prior to reaching a memory barrier.

Aspects of the subject matter described herein may be useful alone or in combination with one or more other aspects described herein. In an 11th exemplary aspect of the present disclosure a method includes executing, by a first thread, a plurality of instructions that includes a restartable sequence. The method also includes receiving, by one of the first thread and a different second thread, an interrupt and pausing execution of the plurality of instructions due to the first thread being preempted. Responsive to the different second thread, in communication with the first thread, being preempted while the first thread is executing the restartable sequence, the method includes restarting the restartable sequence and continue executing the plurality of instructions prior to reaching a memory barrier.

In accordance with a 12th exemplary aspect of the present disclosure, which may be used in combination with any one or more of the preceding aspects (e.g., the 11th aspect), the restartable sequence includes a region of code that is tagged as atomic.

In accordance with a 13th exemplary aspect of the present disclosure, which may be used in combination with any one or more of the preceding aspects (e.g., the 11th aspect), the restartable sequence is an atomic range of instructions.

In accordance with a 14th exemplary aspect of the present disclosure, which may be used in combination with any one or more of the preceding aspects (e.g., the 11th aspect), the plurality of instructions includes a read instruction to read a value after the restartable sequence.

In accordance with a 15th exemplary aspect of the present disclosure, which may be used in combination with any one or more of the preceding aspects (e.g., the 14th aspect), the restartable sequence includes a write instruction to modify the value.

In accordance with a 16th exemplary aspect of the present disclosure, which may be used in combination with any one or more of the preceding aspects (e.g., the 15th aspect), the first thread is configured to execute the read instruction without executing a barrier.

In accordance with a 17th exemplary aspect of the present disclosure, which may be used in combination with any one or more of the preceding aspects (e.g., the 11th aspect), the first thread and the different second thread execute on a physical processor.

In accordance with an 18th exemplary aspect of the present disclosure, which may be used in combination with any one or more of the preceding aspects (e.g., the 11th aspect), the first thread and the different second thread execute on different physical processors.

In accordance with a 19th exemplary aspect of the present disclosure, which may be used in combination with any one or more of the preceding aspects (e.g., the 11th aspect), the method further includes resuming, by the first thread, operation on a different processor.

In accordance with a 20th exemplary aspect of the present disclosure, which may be used in combination with any one or more of the preceding aspects (e.g., the 11th aspect), the method further includes responsive to the first thread being preempted while executing the restartable sequence, resuming execution, by the first thread, of the plurality of instructions by restarting the restartable sequence prior to reaching a memory barrier.

Aspects of the subject matter described herein may be useful alone or in combination with one or more other aspects described herein. In a 21st exemplary aspect of the present disclosure a non-transitory machine-readable medium stores code, which when executed by a processor, is configured to execute a plurality of instructions on a first hardware thread. The plurality of instructions includes a restartable sequence. The non-transitory machine-readable medium is also configured to receive an interrupt and pause execution of the plurality of instructions on the first hardware thread from the first hardware thread being preempted. Responsive to a different second thread in communication with the first hardware thread being preempted while the first hardware thread is executing the restartable sequence, the non-transitory machine-readable medium is configured to restart the restartable sequence and continue executing the plurality of instructions prior to reaching a memory barrier.

In accordance with a 22nd exemplary aspect of the present disclosure, which may be used in combination with any one or more of the preceding aspects (e.g., the 21st aspect), the restartable sequence includes a region of code that is tagged as atomic.

In accordance with a 23rd exemplary aspect of the present disclosure, which may be used in combination with any one or more of the preceding aspects (e.g., the 21st aspect), the restartable sequence is an atomic range of instructions.

In accordance with a 24th exemplary aspect of the present disclosure, which may be used in combination with any one or more of the preceding aspects (e.g., the 21st aspect), the plurality of instructions includes a read instruction to read a value after the restartable sequence.

In accordance with a 25th exemplary aspect of the present disclosure, which may be used in combination with any one or more of the preceding aspects (e.g., the 24th aspect), the restartable sequence includes a write instruction to modify the value.

In accordance with a 26th exemplary aspect of the present disclosure, which may be used in combination with any one or more of the preceding aspects (e.g., the 25th aspect), the first hardware thread is configured to execute the read instruction without executing a barrier.

In accordance with a 27th exemplary aspect of the present disclosure, which may be used in combination with any one or more of the preceding aspects (e.g., the 21st aspect), the first hardware thread and the different second thread execute on a physical processor.

In accordance with a 28th exemplary aspect of the present disclosure, which may be used in combination with any one or more of the preceding aspects (e.g., the 21st aspect), the first hardware thread and the different second thread execute on different physical processors.

In accordance with a 29th exemplary aspect of the present disclosure, which may be used in combination with any one or more of the preceding aspects (e.g., the 21st aspect), the non-transitory machine-readable medium is further configured to resume operation on a different processor.

Aspects of the subject matter described herein may be useful alone or in combination with one or more other aspects described herein. In a 30th exemplary aspect of the present disclosure a system includes a means for executing a plurality of instructions. The plurality of instructions includes a restartable sequence. The system also includes a means for receiving an interrupt, a means for pausing execution of the plurality of instructions and a means for resuming execution of the plurality of instructions by restarting the restartable sequence responsive to a first thread being preempted while executing the restartable sequence prior to reaching a memory barrier. Additionally, the system includes a means for restarting the restartable sequence and continuing execution of the plurality of instructions responsive to a different second thread in communication with the first thread being preempted while the first thread is executing the restartable sequence prior to reaching the memory barrier.

Aspects of the subject matter described herein may be useful alone or in combination with one or more other aspects described herein. In a 31st exemplary aspect of the present disclosure a system includes a memory and at least one processor in communication with the memory executing a first thread and a second thread. The second thread is configured to execute a restartable portion of instructions to update a data structure. While executing the restartable portion, the second thread is configured to determine a status as one of (i) running on the same physical processor as the first thread and (ii) running on a different physical processor as the first thread. Responsive to determining the status as running on the same physical processor as the first thread, the second thread is configured to execute a read instruction within the restartable portion. Responsive to determining the status as running on a different physical processor, the second thread is configured to execute the read instruction after a memory barrier by restarting the restartable portion of instructions.

In accordance with a 32nd exemplary aspect of the present disclosure, which may be used in combination with any one or more of the preceding aspects (e.g., the 31st aspect), the memory barrier is a write memory barrier.

In accordance with a 33rd exemplary aspect of the present disclosure, which may be used in combination with any one or more of the preceding aspects (e.g., the 31st aspect), the memory barrier is a fence.

In accordance with a 34th exemplary aspect of the present disclosure, which may be used in combination with any one or more of the preceding aspects (e.g., the 31st aspect), the restartable portion of instructions includes a region of code that is tagged as atomic.

In accordance with a 35th exemplary aspect of the present disclosure, which may be used in combination with any one or more of the preceding aspects (e.g., the 31st aspect), the restartable portion of instructions is an atomic range of instructions.

In accordance with a 36th exemplary aspect of the present disclosure, which may be used in combination with any one or more of the preceding aspects (e.g., the 31st aspect), the second thread is configured to pause execution of the restartable portion responsive to being preempted during execution of the restartable portion.

In accordance with a 37th exemplary aspect of the present disclosure, which may be used in combination with any one or more of the preceding aspects (e.g., the 36th aspect), the second thread is configured to resume operation on a different physical processor.

In accordance with a 38th exemplary aspect of the present disclosure, which may be used in combination with any one or more of the preceding aspects (e.g., the 36th aspect), the second thread is configured to resume operation on the same physical processor.

In accordance with a 39th exemplary aspect of the present disclosure, which may be used in combination with any one or more of the preceding aspects (e.g., the 36th aspect), the second thread is configured to determine the status after resuming operation.

In accordance with a 40th exemplary aspect of the present disclosure, which may be used in combination with any one or more of the preceding aspects (e.g., the 31st aspect), the second thread is configured to determine a second status as one of (i) running on a different hyper-thread as the first thread and (ii) running on the same hyper-thread as the first thread.

Aspects of the subject matter described herein may be useful alone or in combination with one or more other aspects described herein. In a 41st exemplary aspect of the present disclosure a method includes executing, by a thread, a restartable portion of instructions to update a data structure. While executing the restartable portion, the method includes determining, by the thread, a status of the thread as one of (i) running on the same physical processor as a different thread and (ii) running on a different physical processor than the different thread. Responsive to determining the status as running on the same physical processor as the different thread, the method includes executing, by the thread, a read instruction within the restartable portion. Responsive to determining the status as running on a different physical processor, the method includes executing, by the thread, a read instruction after a write memory barrier by restarting the restartable portion of instructions.

In accordance with a 42nd exemplary aspect of the present disclosure, which may be used in combination with any one or more of the preceding aspects (e.g., the 41st aspect), the method further includes determining, by the thread, a second status as one of (i) running on a different hyper-thread as the first thread and (ii) running on the same hyper-thread as the first thread.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
at least one physical processor in communication with the memory; and
a plurality of hardware threads executing on the at least one physical processor configured to:
execute, by a first hardware thread, one or more first instructions at a first time instant that modifies a value of a data structure;
execute, by the first hardware thread, a plurality of second instructions at a second time instant that occurs after the first time instant, wherein the plurality of second instructions is different than the one or more first instructions, and wherein the plurality of second instructions is tagged as atomic;
receive, by a second hardware thread, an interrupt at a third time instant that occurs after the second time instant, wherein the second hardware thread is different than the first hardware thread, and wherein the first hardware thread communicates with the second hardware thread;
responsive to the second hardware thread receiving the interrupt:
pause, by the first hardware thread, execution of the plurality of second instructions at the third time instant; and
restart, by the first hardware thread and at a fourth time instant that occurs after the third time instant, execution of the plurality of second instructions from the point at which the plurality of second instructions was executing at the second time instant prior to the first hardware thread reaching a write memory barrier; and
execute, after the fourth time instant and by the first hardware thread, a read instruction after the write memory barrier.

2. The system of claim 1, wherein the first hardware thread and the different second hardware thread execute on the same physical processor.

3. The system of claim 1, wherein the first hardware thread and the different second hardware thread execute on different physical processors.

4. The system of claim 1, wherein the first hardware thread is configured to resume operation on a different physical processor.

5. A method comprising:
executing, by a first hardware thread, one or more first instructions at a first time instant that modifies a value of a data structure;
executing, by the first hardware thread, a plurality of second instructions at a second time instant that occurs after the first time instant, wherein the plurality of second instructions is different than the one or more first instructions, and wherein the plurality of second instructions is tagged as atomic;
receiving, by a second hardware thread, an interrupt at a third time instant that occurs after the second time instant, wherein the second hardware thread is different than the first hardware thread, and wherein the first hardware thread communicates with the second hardware thread;
responsive to the second hardware thread receiving the interrupt:
    pausing, by the first hardware thread, execution of the plurality of second instructions at the third time instant; and
    restarting, by the first hardware thread and at a fourth time instant that occurs after the third time instant, execution of the plurality of second instructions from the point at which the Plurality of second instructions was executing at the second time instant prior to the first hardware thread reaching a write memory barrier; and
executing, after the fourth time instant by the first hardware thread, a read instruction after the write memory barrier.

6. The method of claim 5, wherein the first hardware thread and the different second hardware thread execute on the same physical processor.

7. The method of claim 5, wherein the first hardware thread and the different second hardware thread execute on different physical processors.

8. The method of claim 5, wherein the first hardware thread is configured to resume operation on a different physical processor.

9. A non-transitory computer-readable storage medium storing instructions which, when executed by a processor, cause the processor to:
execute, by a first hardware thread, one or more first instructions at a first time instant that modifies a value of a data structure;
execute, by the first hardware thread, a plurality of second instructions at a second time instant that occurs after the first time instant, wherein the plurality of second instructions is different than the one or more first instructions, and wherein the plurality of second instructions is tagged as atomic;
receive, by a second hardware thread, an interrupt at a third time instant that occurs after the second time instant, wherein the second hardware thread is different than the first hardware thread, and wherein the first hardware thread communicates with the second hardware thread;
responsive to the second hardware thread receiving the interrupt:
    pause, by the first hardware thread, execution of the plurality of second instructions at the third time instant; and
    restart, by the first hardware thread and at a fourth time instant that occurs after the third time instant, execution of the plurality of second instructions from the point at which the plurality of second instructions was executing at the second time instant prior to the first hardware thread reaching a write memory barrier; and
execute, after the fourth time instant and by the first hardware thread, a read instruction after the write memory barrier.

10. The non-transitory computer-readable storage medium of claim 9, wherein the first hardware thread and the different second hardware thread execute on the same physical processor.

11. The non-transitory computer-readable storage medium of claim 9, wherein the first hardware thread is configured to resume operation on a different physical processor.

12. The non-transitory computer-readable storage medium of claim 9, wherein the first hardware thread and the different second hardware thread execute on different physical processors.

* * * * *

UNITED STATES PATENT AND TRADEMARK OFFICE
CERTIFICATE OF CORRECTION

Page 1 of 1

PATENT NO. : 11,449,339 B2
APPLICATION NO. : 16/586099
DATED : September 20, 2022
INVENTOR(S) : Tsirkin et al.

It is certified that error appears in the above-identified patent and that said Letters Patent is hereby corrected as shown below:

In the Specification

In Column 5, Line 18, replace "VIVID" with -- VMD --.

In the Claims

In Column 17, Line 25, Claim 5, replace "Plurality" with -- plurality --.

Signed and Sealed this
Twenty-fourth Day of January, 2023

Katherine Kelly Vidal
*Director of the United States Patent and Trademark Office*